United States Patent
Eisenman

(10) Patent No.: US 10,028,120 B2
(45) Date of Patent: Jul. 17, 2018

(54) IDENTIFICATION CARD HOLDER WITH PERSONAL LOCATOR

(71) Applicant: Global Life-Line, Inc., Newport Beach, CA (US)

(72) Inventor: Robert Eisenman, Newport Beach, CA (US)

(73) Assignee: GLOBAL LIFE-LINE, INC., Newport Beach, CA (US)

( * ) Notice: Subject to any disclaimer, the term of this patent is extended or adjusted under 35 U.S.C. 154(b) by 0 days.

(21) Appl. No.: 14/625,396

(22) Filed: Feb. 18, 2015

(65) Prior Publication Data
US 2016/0240075 A1 Aug. 18, 2016

(51) Int. Cl.
| | |
|---|---|
| H04W 4/00 | (2018.01) |
| H04W 4/90 | (2018.01) |
| G08B 13/16 | (2006.01) |
| G08B 25/01 | (2006.01) |
| G07C 9/00 | (2006.01) |

(52) U.S. Cl.
CPC .......... *H04W 4/90* (2018.02); *G08B 13/1672* (2013.01); *G08B 25/016* (2013.01); *G07C 9/00111* (2013.01)

(58) Field of Classification Search
CPC ........ G07C 9/00111; H04Q 9/14; G08B 5/00; G08B 5/224; G08B 13/1672; G08B 25/016; H04W 4/90
See application file for complete search history.

(56) References Cited

U.S. PATENT DOCUMENTS

| | | | |
|---|---|---|---|
| 2,742,233 | A | 4/1956 | Butler |
| 5,382,948 | A | 1/1995 | Richmond |
| 5,515,043 | A | 5/1996 | Berard et al. |
| 5,515,419 | A | 5/1996 | Sheffer |
| 5,555,286 | A | 9/1996 | Tendler |
| 5,629,761 | A | 5/1997 | Theodoulou et al. |
| 5,630,206 | A | 5/1997 | Urban et al. |
| 5,650,770 | A | 7/1997 | Schlager et al. |
| 5,652,570 | A * | 7/1997 | Lepkofker ............ A61B 5/1112 340/407.1 |
| 5,742,233 | A | 4/1998 | Hoffman et al. |
| 5,808,564 | A | 9/1998 | Simms et al. |
| 5,838,237 | A | 11/1998 | Revell et al. |

(Continued)

OTHER PUBLICATIONS

Dana, P.H. et al., "Unit 017-Global Positioning System Overview", NCGIA Core Curriculum in Geographic Information Science, http://www.ncgia.ucsb.edu/giscc/units/u017/u017_f.html, screen capture Sep. 25, 2013.

(Continued)

*Primary Examiner* — Brian Miller
(74) *Attorney, Agent, or Firm* — Fish IP Law, LLP

(57) ABSTRACT

An ID card and/or cell phone holder provides position identification, 2-way communication, and panic control features for emergency communication. Contemplated holders include those configured as a wallet, arm band, belt clip, or money clip, and can additionally or alternatively be adapted for use with a key ring, lanyard, or other carrying adapter. Position identification circuitry, the communication circuitry, and the panic control interface can be physically distributed between or among at least first and second cards or other components.

15 Claims, 7 Drawing Sheets

(56) References Cited

U.S. PATENT DOCUMENTS

| | | |
|---|---|---|
| 5,864,297 A | 1/1999 | Sollestre et al. |
| 5,884,199 A | 3/1999 | Maki |
| 5,899,855 A | 5/1999 | Brown |
| 5,913,827 A | 6/1999 | Gorman |
| 5,929,761 A * | 7/1999 | Van der Laan ........ H04M 11/04 340/539.1 |
| 5,929,777 A * | 7/1999 | Reynolds ................. G01S 1/70 250/339.14 |
| 5,933,080 A * | 8/1999 | Nojima ................ G08B 25/016 340/3.3 |
| 5,959,529 A | 9/1999 | Kail, IV |
| 5,963,130 A | 10/1999 | Schlager et al. |
| 5,973,412 A | 10/1999 | Nantz et al. |
| 6,028,514 A | 2/2000 | Lemelson et al. |
| 6,044,257 A * | 3/2000 | Boling ................... G08B 7/064 455/404.2 |
| 6,052,062 A * | 4/2000 | Tuttle .................... G06K 19/06 257/787 |
| 6,084,517 A | 7/2000 | Rabanne et al. |
| 6,094,140 A * | 7/2000 | Parente ................ G08B 25/016 340/451 |
| 6,166,627 A | 12/2000 | Reeley |
| 6,292,110 B1 | 9/2001 | Budnovitch |
| 6,362,778 B2 * | 3/2002 | Neher .................. G01S 5/0018 342/357.75 |
| 6,392,592 B1 | 5/2002 | Johnson et al. |
| 6,437,692 B1 | 8/2002 | Petite et al. |
| 6,539,301 B1 | 3/2003 | Shirk et al. |
| 6,738,712 B1 * | 5/2004 | Hildebrant ............. G01C 21/26 701/431 |
| 6,943,666 B2 * | 9/2005 | Mooney ................ H02J 7/0045 307/10.3 |
| 6,946,977 B2 | 9/2005 | Chen et al. |
| 7,042,338 B1 | 5/2006 | Weber |
| 7,042,342 B2 * | 5/2006 | Luo ......................... B60R 25/00 340/426.13 |
| 7,142,096 B2 * | 11/2006 | Eisenman ........... B60R 25/1003 340/10.1 |
| 7,202,775 B2 * | 4/2007 | Yezersky .............. B60R 25/257 307/10.1 |
| 7,251,471 B2 * | 7/2007 | Boling ................... G08B 15/00 340/539.12 |
| 7,301,442 B2 * | 11/2007 | Kolpasky .............. B60R 25/257 307/10.2 |
| 7,315,242 B2 * | 1/2008 | Eisenman ........... B60R 25/1003 340/426.1 |
| 7,802,724 B1 * | 9/2010 | Nohr ................... G07C 9/00111 235/384 |
| 7,956,743 B2 * | 6/2011 | Mosteller ......... G06K 19/07749 340/10.1 |
| 7,986,961 B2 * | 7/2011 | Gasborro ............... G01C 21/20 455/404.2 |
| 8,249,547 B1 * | 8/2012 | Feltner ............... G08B 21/0446 455/404.1 |
| 8,373,540 B2 * | 2/2013 | Solomon ............. G06Q 10/087 340/5.52 |
| 8,461,983 B2 * | 6/2013 | McCauley ........... G08B 25/001 340/539.1 |
| 8,508,361 B2 * | 8/2013 | Paolini ................. G01S 5/0027 340/539.13 |
| 8,577,543 B2 * | 11/2013 | Basir ................... B60R 16/0373 455/563 |
| 8,594,730 B2 * | 11/2013 | Bona ................ G06K 19/06187 455/550.1 |
| 8,742,924 B2 * | 6/2014 | Eisenman ........... B60R 25/1003 340/426.1 |
| 8,814,052 B2 * | 8/2014 | Bona ..................... G06K 19/06 235/487 |
| 8,831,557 B2 * | 9/2014 | Jung ..................... H04W 12/08 455/404.2 |
| 8,955,744 B2 * | 2/2015 | Granucci ............... G06K 19/07 235/380 |
| 9,002,317 B2 * | 4/2015 | Hymowitz .............. H04W 4/22 455/404.1 |
| 9,230,417 B2 * | 1/2016 | Reilly .................... A42B 3/046 |
| 9,374,698 B2 * | 6/2016 | Ahmed .................. H04W 4/22 |
| 2001/0003443 A1 | 6/2001 | Velazquez et al. |
| 2001/0028196 A1 | 10/2001 | Burr et al. |
| 2001/0029410 A1 | 10/2001 | Obradovich |
| 2001/0053947 A1 | 12/2001 | Lenz et al. |
| 2002/0024443 A1 | 2/2002 | Hawkins et al. |
| 2002/0070863 A1 * | 6/2002 | Brooking ............... G07B 15/02 340/572.1 |
| 2002/0095587 A1 * | 7/2002 | Doyle .................. G06Q 20/341 713/186 |
| 2003/0231550 A1 * | 12/2003 | Macfarlane ........... B60R 25/257 367/198 |
| 2004/0005914 A1 * | 1/2004 | Dear .................... H04B 1/3822 455/563 |
| 2004/0180668 A1 | 9/2004 | Owens et al. |
| 2005/0239450 A1 * | 10/2005 | Wesby ..................... H04M 1/05 455/418 |
| 2006/0229114 A2 | 10/2006 | Kim |
| 2007/0051842 A1 * | 3/2007 | Pryor .................... A45C 11/182 242/378.3 |
| 2007/0082652 A1 * | 4/2007 | Hartigan ............. G08B 21/0277 455/404.2 |
| 2007/0093237 A1 * | 4/2007 | Bayne ................... H04W 64/00 455/414.2 |
| 2007/0200716 A1 * | 8/2007 | Haase ................... G08B 15/004 340/574 |
| 2009/0159703 A1 * | 6/2009 | Mullen ............ G06K 19/06206 235/493 |
| 2009/0179417 A1 * | 7/2009 | Murra .................... A61B 5/117 283/77 |
| 2010/0265102 A1 * | 10/2010 | Eisenman ............. B60R 25/102 340/988 |
| 2011/0016064 A1 * | 1/2011 | Barton ................. G06F 19/3418 706/11 |
| 2011/0046920 A1 * | 2/2011 | Amis ...................... G01S 19/16 702/181 |
| 2011/0068915 A1 * | 3/2011 | Wakefield, III ........ G01S 5/0009 340/539.13 |
| 2012/0052836 A1 * | 3/2012 | Buratti ............... H04M 1/72541 455/404.2 |
| 2013/0036480 A1 * | 2/2013 | Anderson ............ H04L 63/0853 726/30 |
| 2014/0266590 A1 * | 9/2014 | Guillaud ............. G07C 9/00119 340/5.65 |
| 2014/0323079 A1 * | 10/2014 | Paolini ................ G08B 25/016 455/404.2 |
| 2017/0026504 A1 * | 1/2017 | Nichols ............... H04M 1/7253 |

OTHER PUBLICATIONS

"7mm Personal Management ID Card GPS Tracker", Yulongda (Hong Kong) Technology Limited), http://www.yulongdatechnology.com/#!7mm-personal-gps-card-tracker/ctt5, screen capture Nov. 11, 2014.

"AMS LoneWorker", Asset Monitoring Solutions, Product Information Sheet, retrieved Jul. 17, 2014.

\* cited by examiner

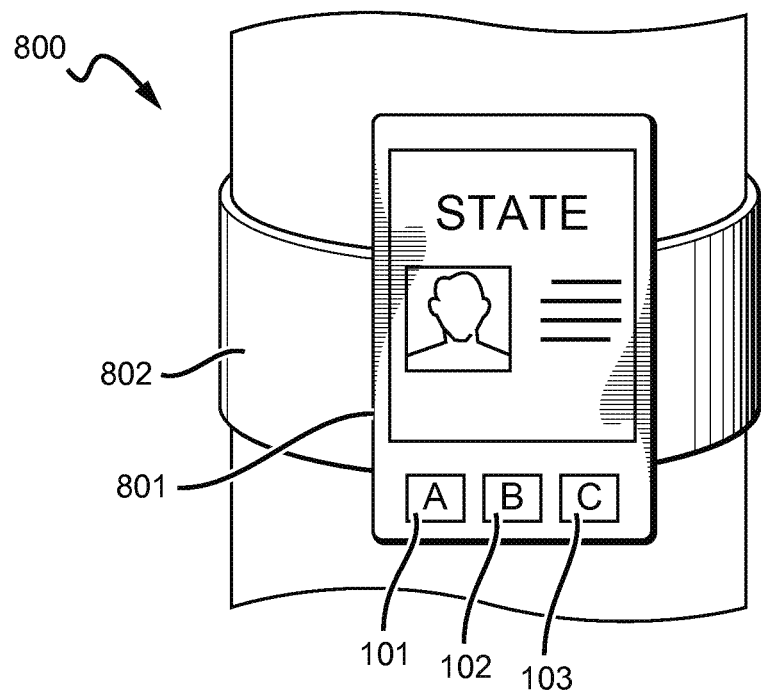
FIG. 8
FIG. 9
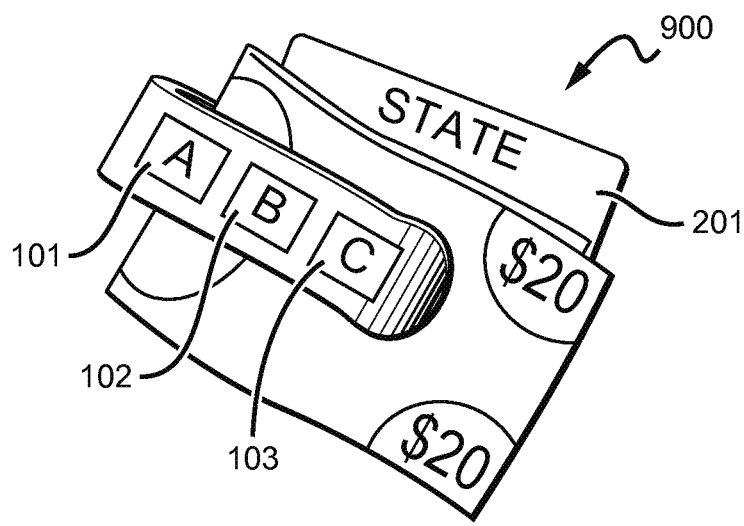

IDENTIFICATION CARD HOLDER WITH PERSONAL LOCATOR

FIELD OF THE INVENTION

The field of the invention is emergency alert systems and methods.

BACKGROUND

This background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

There are many situations in which a person may desire assistance from a distal source, but has very little time to do so. For example, a person may be in a potentially dangerous situation where the person would like to contact the police or other security personnel. Sometimes removing a cell phone from one's pocket or purse to dial 911 might be impractical, or even impossible. Or perhaps a person might have a medical emergency and be unable to dial emergency personnel, again because the phone might not be reachable, or possibly because the person has insufficient time, or is incapacitated for some reason.

Many devices have been created in order to quickly contact emergency personnel. For example, U.S. Pat. No. 5,650,770 to Schlager et al, teaches a personal alarm system where a monitoring base station tracks remote sensing units similar to old Life Alert® monitoring systems. The base station can be configured to sense when the panic button is pressed, and could then summon help. Such a device, however, requires the user to remain in range of the monitoring system and wear a device, which is often unsightly, bulky, and has no utility beyond summoning help if the user is in a fight or flight situation.

U.S. Pat. No. 7,042,338 to Weber, teaches an emergency hailing device that periodically asks an at-risk user if the user is OK. If the at-risk user fails to respond to the automatic interrogation signal, the device automatically summons an emergency service or care provider. Weber, however, also requires a user to remain in range of a nearby receiver to process the signal and determine an alarm action. The device also has no utility beyond regularly checking on a user and summoning help if the user is in a dangerous situation.

Other co-owned patents, including for example U.S. Pat. No. 7,142,096 to Eisenman, U.S. Pat. No. 7,315,242 to Eisenman and U.S. Pat. No. 8,742,924 to Eiseman disclose a key FOB that unlocks a car and also has GPS and alarm capability to communicate with distal devices that are further than a localized base station. Subsequent applications within the family claim key-related devices having GPS and alarm capability include key chains, key bags, and also cover devices that gain access to spaces other than motor vehicles, including pending applications U.S. Ser. No. 12/173,630, U.S. Ser. No. 12/773,161, and U.S. Ser. No. 14/294,955. There are some situations, however, where a user might not have a key FOB for a car vehicle, such as when the user lives and works on a campus or the user lives within a city with adequate public transportation infrastructure.

US 2009/0159703 to Mullen teaches a credit card that tracks the location of a user, and can transmit an alarm to authorities when an emergency button on the card is depressed and the card is used (e.g. at an ATM or at a store). Mullen, however, requires the user to be at a swiping location in order to sound an alarm, which is not always the case when a card holder needs to summon help.

The Personal Management ID Card GPS Tracker sold by YuLongDa provides an identification card having a GPS function that allows for remote location tracking, as well as a SOS alarm feature that sends an SMS message to a designated cell phone number when a button is pressed or an ID card moves outside of a designated geofence area. However, the YuLongDa ID card fails to provide anything more than a single pre-set SOS message. Emergency nuances cannot be communicated, and so a receiver of an emergency alert has no idea whether the person in the emergency needs police, medical attention, or is merely lost.

Thus, there is still a need for casings or other holders that provide position identification, 2-way communication, and panic control features for emergency communication.

SUMMARY OF THE INVENTION

After more than 13 years dealing with this concept, I have only recently appreciated that there is a need to provide extremely simplified access to emergency communication from an identification card holder. This may arise, for example, where a student at a university gym is not carrying any keys, but instead has only a student identification card and the card holder. Similarly, a woman working getting food at a snack shop may be carrying only an office identification card, a card holder, and some cash, having left her cell phone and keys in her purse in a nearby office. Additionally, a jogger could be injured on a run, and may have only brought an identification card and card holder to avoid being weighed down by extra possessions. In yet another example, two roommates out on the town might get separated, leaving one with only an identification card and card holder because the other is holding the keys for the night.

I now realize that identification card holders could be advantageous to fulfill this need because identification cards and card holders are regularly used in the course of daily life in the form of drivers' licenses, medical insurance cards, employee identification cards, and so forth. Additionally, people generally always carry some form of identification whether for purposes of merely verifying their identity, making a credit card purchase, obtaining medical treatment under an insurance policy, gaining entry into a private or employees-only area, etc.

Even for persons carrying a cell phone in their clothing, purse, backpack, etc, retrieving the phone, entering a pass code or otherwise unlocking the phone, and then dialing 911, would very likely be inconvenient at best, and completely unworkable from a time standpoint at best. Moreover, these operations might not be feasible under duress. Additionally, cell phones do not typically send location information directly to emergency personnel. In most cases cell phone location is triangulated using cell towers. Ideally, such simplified access to emergency communication would instead immediately transmit the position information to the contacted emergency personnel.

The inventive subject matter is directed to an identification card holder with position identification, 2-way communication, and a panic control feature.

Any one or more of (a) the position identification, (b) the 2-way communication or (c) the panic control feature can be disposed as part of the identification card holder.

In another contemplated embodiment, the position identification can utilize any suitable location tracking technology, including for example, GPS, RFID, NFC, Bluetooth, etc.

2-way communication can be enabled in any suitable manner. This would typically be accomplished using at least a microphone and speaker for voice communication, but could, for example, be additionally enabled using a display screen, and alarm sound enabled by a signal transducer that could issue a sound much louder than would be practical with a speaker.

In other aspects of the inventive subject matter, the panic control feature can be triggered in any suitable manner. For example, a device could use a physical feature (e.g., buttons, bump, touch screen), a sound receiving feature, (e.g., voice recognition, alarm noise recognition), tactile feature (e.g., three quick squeezes on the body of the card), or any combination of those.

All practical manner of wearable or carryable card holders are contemplated, including dedicated and non-dedicated card holders. Dedicated card holders, for example, include a plastic covering snugly fitting about an ID card, which might be hung from the neck using a lanyard, or clipped onto a pocket or lapel. Also contemplated are card holders attached to the end of a retractable leash, which might be clipped at the other end to a belt. Contemplated non-dedicated card holders includes a wallet, a money clip, a cell phone cover having a space for an ID card, a business card holder, a headband or arm band, or even a pants or jacket pocket.

Some contemplated embodiments include a key ring, key bag or other key holder that includes or attaches one or more of the position identification, 2-way communication or panic control feature. For example, a key ring could couple an identification card and a separate card or other device that holds the 2-way communication capability.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 8 is a front view of an arm band that holds an identification card, where the arm band houses position identification, 2-way communication, and panic control features.

FIG. 9 is a front view of a money clip that holds money and an identification card, where the money clip houses position identification, 2-way communication, and panic control features.

DETAILED DESCRIPTION

As used herein, the term "identification card apparatus" means any contemplated identification card holder and any other device(s) mechanically coupled to the identification card holder.

Figure 1:
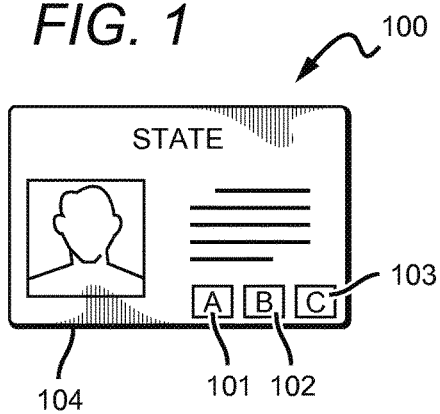
FIG. 1 is a front view of an identification card that contains position identification, 2-way communication, and panic control features.

FIG. 1 generally depicts identification card 100 having features 101, 102, and 103. Identification card 100 should be interpreted generically as any sort of ID card having a maximum thickness 104 of 7 mm. Contemplated identification cards (ID cards) include, for example, a drivers' license, a school ID card, a social security or other government ID card, a card that permits entry into a space, a passport, a credit card. Contemplated ID cards can be readable in one or more ways, for example, mechanically, electronically, or biologically (e.g., by ordinary vision).

ID cards in this application are limited to 7 mm maximum thickness as a way of distinguishing cell phones and other devices that are not primarily used as identification, and to more clearly establish that an ID card is indeed a card. ID cards are preferably no more than 6 mm in maximum thickness, more preferably no more than 5 mm in maximum thickness, more preferably no more than 4 mm in maximum thickness, more preferably no more than 3 mm in maximum thickness, and most preferably no more than 2 mm in maximum thickness.

Features 101, 102, and 103 can be any one of position identification 1020, 2-way communication 1030, and panic control features.

The position identification feature 1020 can utilize any suitable location tracking technology, including for example, global positioning system (GPS), cell tower triangulation, radio-frequency identification (RFID), wireless local area network (WLAN), near field communication (NFC), Bluetooth, Imp™ chip, iBeacon used by Aislelabs, enhanced 911, etc. GPS would work well in situations where the ID card only needs to be tracked on a large scale, for example, generally tracking a travelling employee's location within a city or even across the country or world. However, GPS is limited in smaller areas or indoors because it may not be visible to the number of satellites required to acquire the device's location. Additionally, it may not be as precise in smaller areas. Thus, RFID, NFC, Bluetooth, Imp™ chip, iBeacon, or any other suitable location tracking technology for small areas, would be preferable for locations like a hospital, office building, school campus, mall, amusement park, etc. It is also contemplated that the position identification feature would use a combination of the above discussed features.

Figure 11:
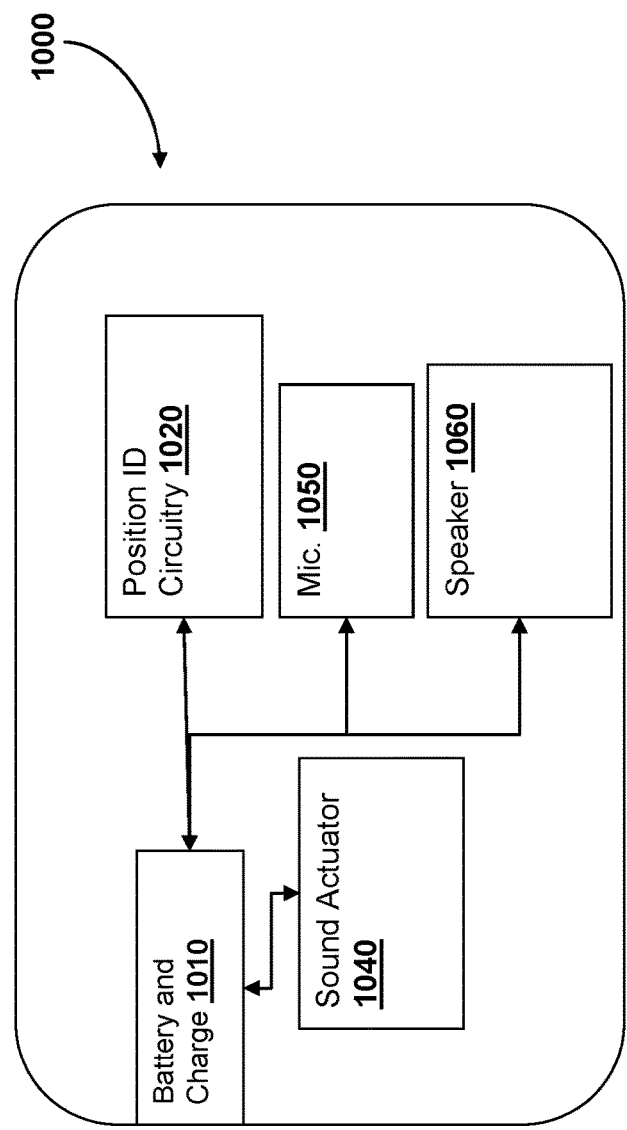
FIG. 11 is a schematic overview f the components of the identification card apparatus, illustrating an embodiment with a microphone and speaker.
Figure 12:
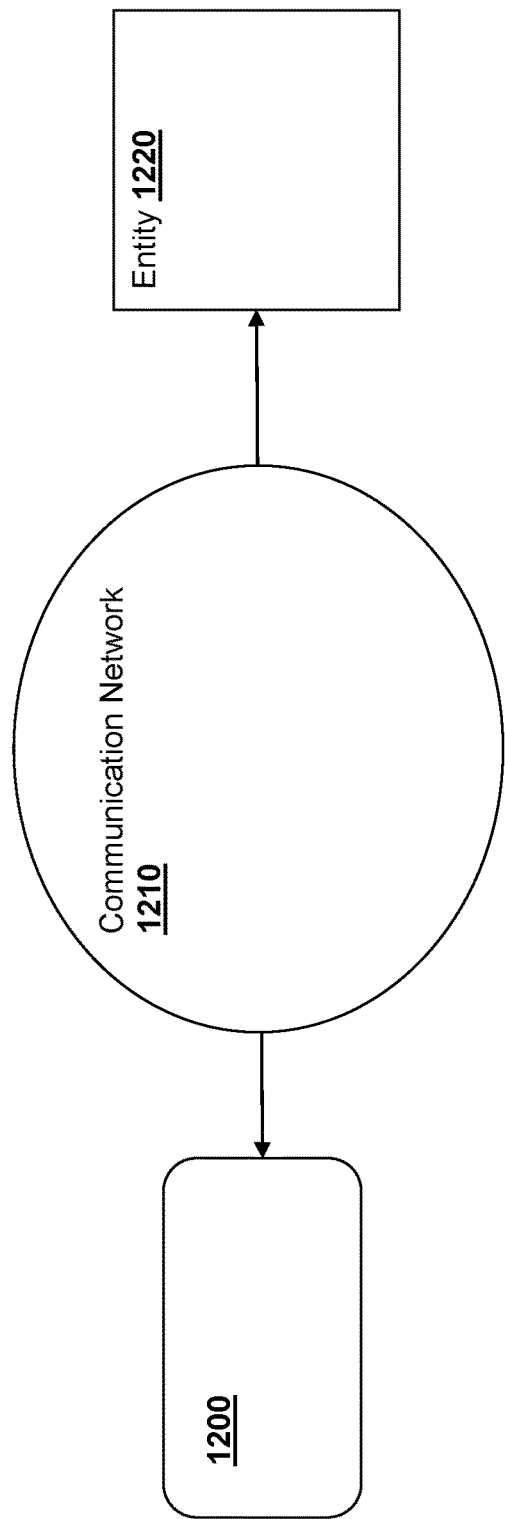
FIG. 12 provides an illustration of the identification card apparatus communicating with a distal party over a communication network.

The 2-way communication feature 1030 can utilize any suitable form of communication technology, including for example, a microphone and speaker for voice communication (such as microphone 1050 and speaker 1060, as illustrated in FIG. 11), a flat speaker, a two-in-one microphone and speaker, a display screen for text communication, a touch screen or keyboard for typing, a speaker to enable sound alerts, a motor to enable vibrating alerts, a light (LED or other suitable light sources) to enable a flashing light alert with a single color or multiple colors for different messages, etc. It is contemplated that the 2-way communication feature would utilize one of these communication technologies or a combination of them. A microphone and speaker combination would allow the user to communicate important information regarding their location, medical needs, whether the attacker has a weapon, and any other necessary information. A display screen for text communication combined with either a keyboard or speech recognition technology (e.g. Dragon,) would also allow for such communication. Using a sound, vibration, or light alert would allow the user to know that help was coming. These types of alerts could be varied such that different sequences or colors gave different messages to the card holder.

Figure 10:
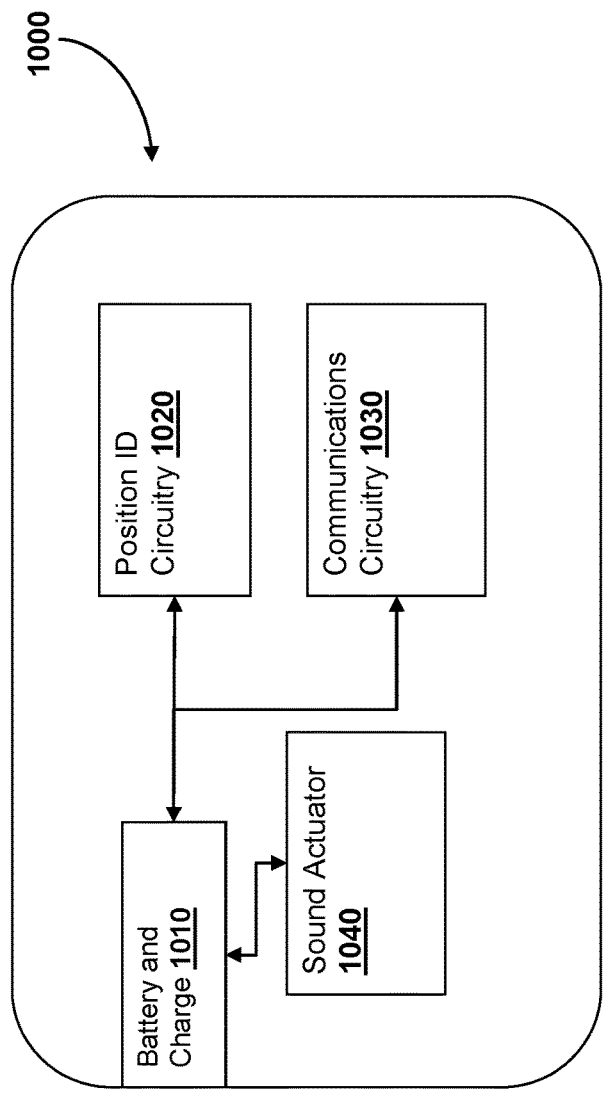
FIG. 10 is a schematic overview of the components of the identification card apparatus.
Figure 13:
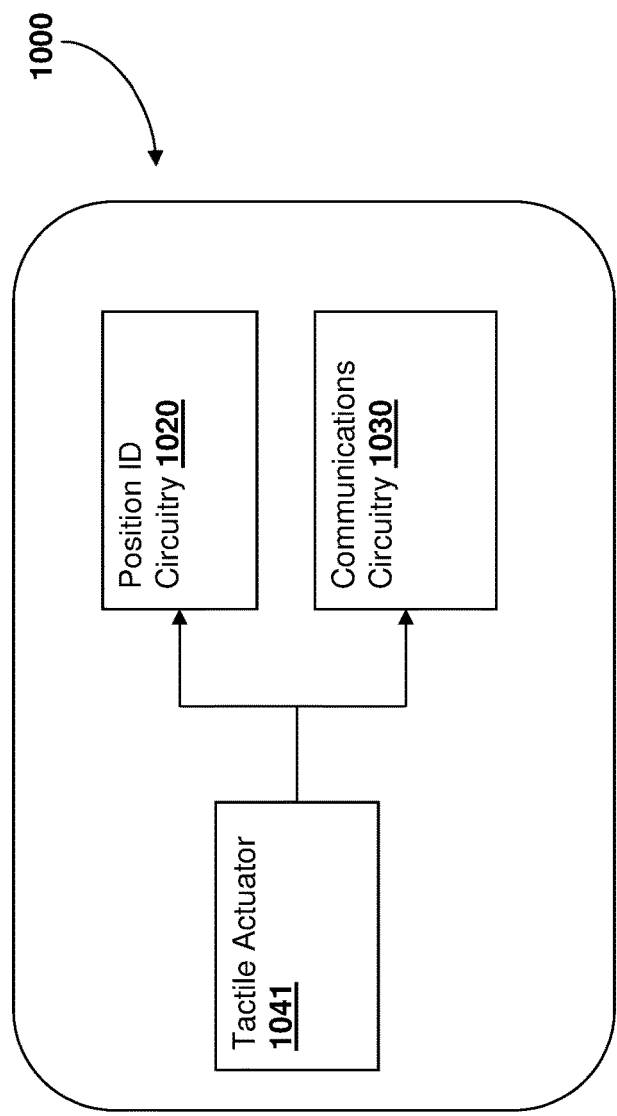
FIG. 13 provides a schematic overview of the tactile panic control feature coupled to the position identification circuitry and two-way communication circuitry, according to embodiments of the inventive subject matter.

The panic control feature is contemplated to be a physical feature (e.g., buttons, bump, touch screen), a sound receiving feature, (e.g., voice recognition, alarm noise recognition such as sound actuator 1040 of FIG. 10), tactile feature 1041 illustrated in FIG. 13 (e.g., three quick squeezes on the body of the card), a light sensor, or any combination of those. The physical or tactile features may be beneficial where the ID card holder would just want to reach into their pocket or otherwise handle the ID card inconspicuously to activate the panic control feature without alerting, and thus aggravating, their attacker. The sound receiving feature could also be set to a keyword or a certain tone of the holder's voice in order to recognize whether the holder wanted to activate the panic control feature. The sound receiving feature could also be set to recognize alarm sounds, such as a fire alarm, fire truck siren, police siren, or any other alarm sound. The panic control feature could also be used in combination with the position identification feature in such a way that the panic control feature was activated where the card or holder left a certain predetermined geographical area, such as a building or school, a city, a home, etc.

The ID card apparatus also is contemplated to have a power supply 1010 for features 101, 102, and 103. The position identification feature, two-way communication feature, and panic control feature would be operatively coupled to the power supply. This power supply could be any suitable power supply, including for example, coin-shaped battery cells, a 9 mm solar sensor, a nano-battery, or any other small suitable power source. The power source may also be charged by inductive charging such that the ID card or holder would charge when placed on an inductive charger. The power source could also use the RFID chip to absorb energy from an electromagnetic radiation power base station. The power source could also be traditionally charged by plugging the ID card or holder into a power source such as a wall charger, a computer, a cigarette lighter in a car, etc.

Figure 2:
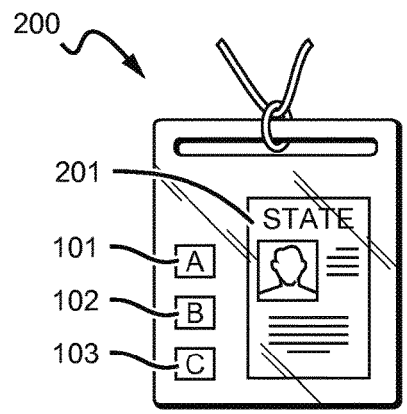
FIG. 2 is a front view of a clear plastic card holder, attached to a lanyard, with an identification card inside, where the card holder houses position identification, 2-way communication, and panic control features.

FIG. 2 generally depicts a clear plastic ID card holder 200 holding an ID card 201. The clear plastic ID card holder 200 has features 101, 102, and 103. The clear plastic ID card holder 200 is contemplated to be a stand-alone holder, attached to a lanyard necklace or bracelet, attached to a keychain, or attached to any other suitable carrying mechanism. The clear holder could also be made from any suitable material for holding ID cards. It is also contemplated that the panic control feature could be integrated into the lanyard so that if it is ripped off or breaks, the feature is activated. The two-way communication feature could also be a speaker and microphone on the lanyard necklace such that the quality of the voice communication is higher because the microphone is closer to the mouth.

Figure 3:
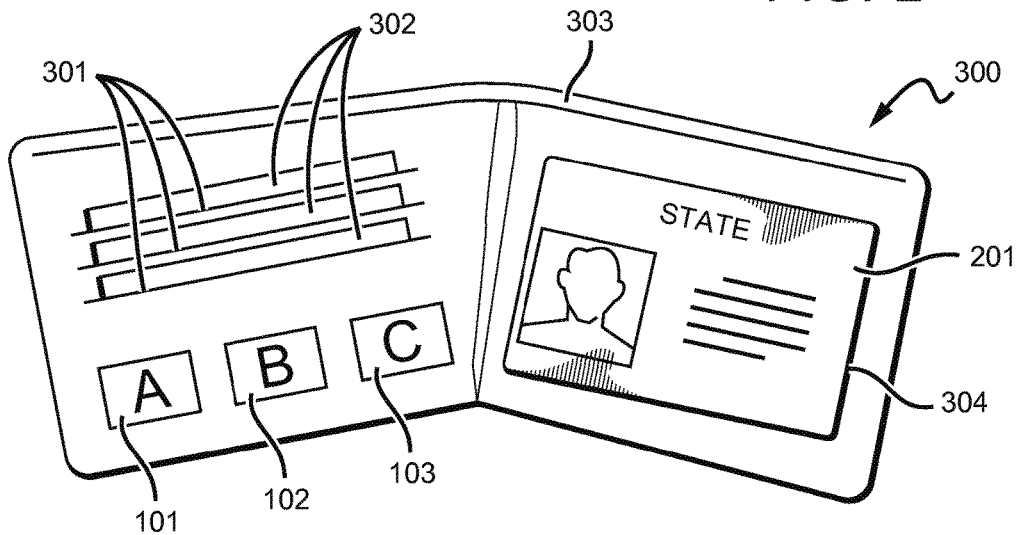
FIG. 3 is a front view of a wallet with an identification card inside, where the wallet houses position identification, 2-way communication, and panic control features.

FIG. 3 generally depicts a wallet 300 with card slots 301 for other types of cards 302, a money compartment 303, and an ID card display slot 304 for holding an ID card 201. The wallet 300 has features 101, 102, and 103 located on the inside fold with the card slots 301, however, it is also contemplated that they could be located on any other suitable part of the wallet 300, including for example, each feature could be located in a different part of the wallet (the panic control feature as a button would be useful if located on the outside of the wallet).

Figure 4:
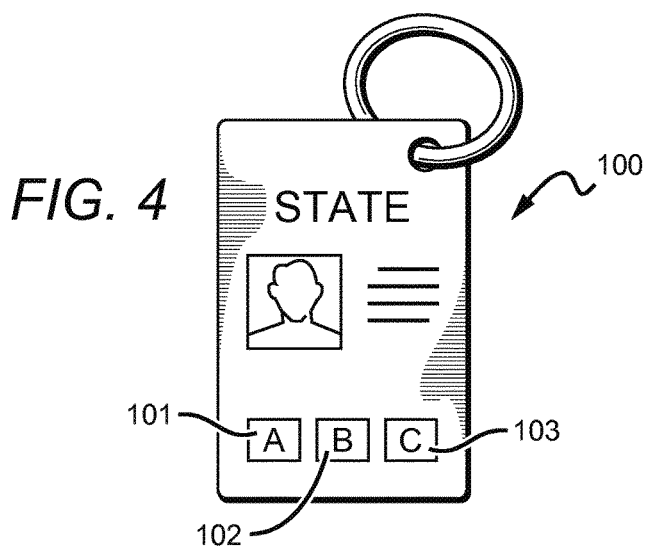
FIG. 4 is a front view of key ring holding an identification card, where the identification card houses position identification, 2-way communication, and panic control features.

FIG. 4 generally depicts identification card 100 on a key ring. Identification card 100 is contemplated to have features 101, 102, and 103 on it.

Figure 5:
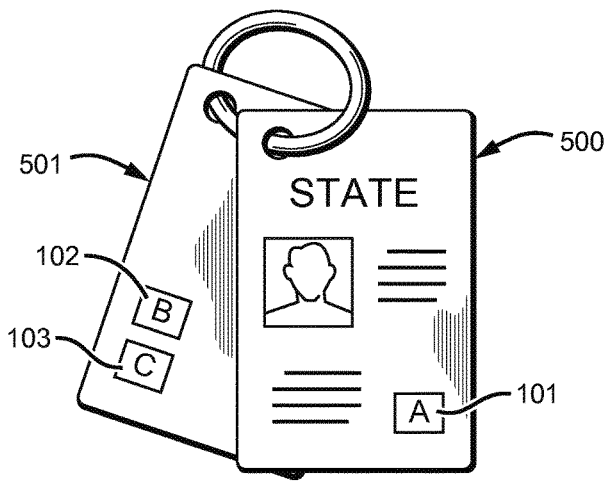
FIG. 5 is a front view of key ring holding an identification card housing at least one of position identification, 2-way communication, and panic control features, and another card housing at least a different one of position identification, 2-way communication, and panic control features.

FIG. 5 generally depicts multiple cards on a key ring. ID card 500 and other card 501 have features 101, 102, and 103 located on them. It is contemplated that ID card 500 could have one or more of features 101, 102, and 103 located on it while other card 501 has the feature(s) not on ID card 500.

Figure 6:
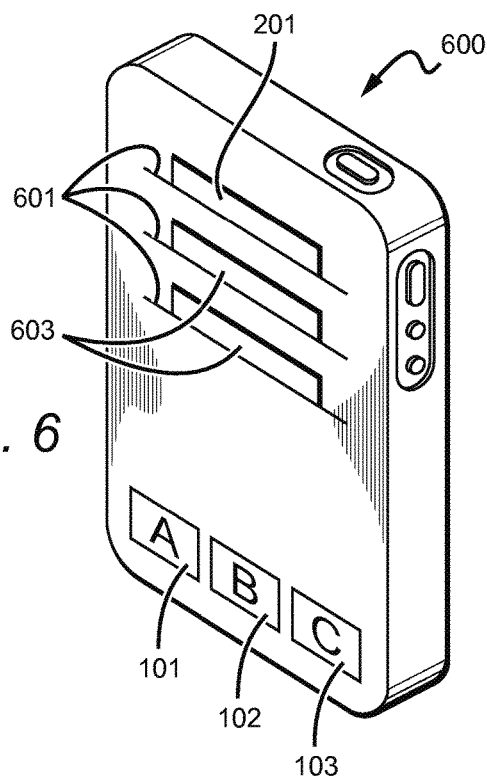
FIG. 6 is a rear view of cell phone case for holding identification cards, where the cell phone case houses position identification, 2-way communication, and panic control features.

FIG. 6 generally depicts a cell phone case 600 with card slots 601 for an ID card 201 and other cards 603. The cell phone case 600 is contemplated to have features 101, 102, and 103 on it in any suitable location. The cell phone case 600 could also have a clear display for ID card 201 instead of card slots 601.

Figure 7:
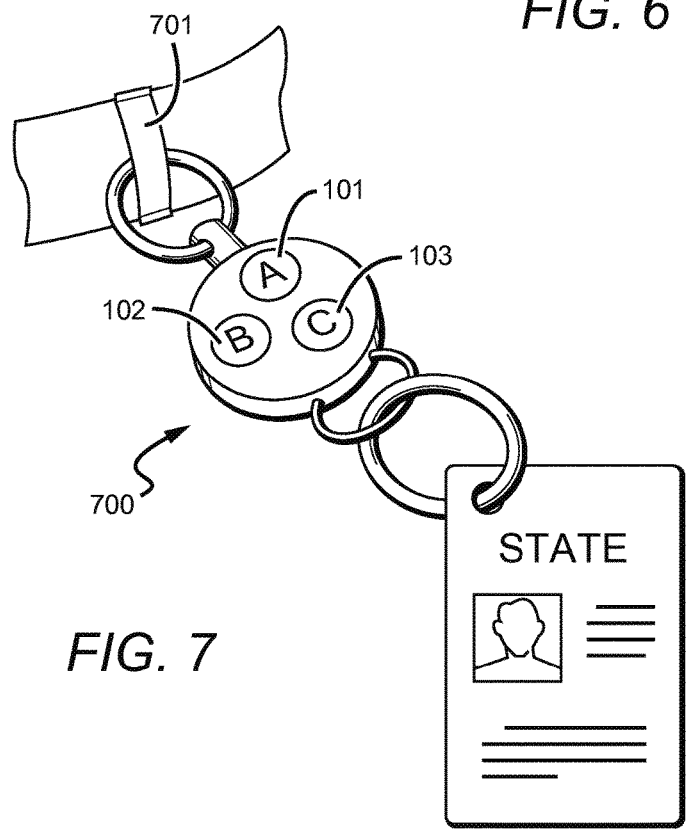
FIG. 7 is a front view of an extendable leash for holding an identification card, where the leash is attached at the belt loop, and contains position identification, 2-way communication, and panic control features.

FIG. 7 generally depicts a retractable badge reel 700 holding an identification card 100. The retractable badge reel 700 is contemplated to have features 101, 102, and 103 on it. The retractable badge reel 700 is also contemplated to attach to belt loop 701 or any other suitable carrying place, including for example, a purse, an attachable clamp, a lanyard necklace, etc.

FIG. 8 generally depicts an arm band ID card holder 800 having 70 features 101, 102, and 103 on it. Arm band ID card holder 800 has an ID card holder portion 801 and an arm band portion 802. Features 101, 102, and 103 are contemplated to be on the holder portion 801, the arm band portion 802, or a combination of both. It is also contemplated that the arm band ID card holder 800 could also be located on other body parts such as an ankle, a thigh, a wrist, a torso, etc.

FIG. 9 generally depicts a money clip 900 holding money and ID card 201. Money clip 900 is contemplated to have features 101, 102, and 103 on it. It is contemplated that the money clip 900 is made of any suitable material, including for example, plastic, gold, silver, other metals, or any combination of those.

It is also contemplated that features 101, 102, and 103 could be modular on each of the above described embodiments such that they could be exchangeable and movable within each holder or ID card.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be noted that any language directed to a computer or processor should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the .Internet, LAN, WAN, VPN, or other type of packet switched network.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An identification card apparatus (ICA), in communication with a cell tower and a distal entity, comprising:
   a visual unique identifier of a user;
   a position identification circuitry configured to derive a set of location coordinates of the ICA;
   a communication circuitry configured to operate a two-way voice communication between the ICA and the distal entity through a communication network; and
   a dedicated tactile panic control interface operable by the user configured to initiate both the two-way communication and communicate the set of location coordinates to the distal entity, all upon actuation of the panic control interface, wherein the dedicated tactile panic control interface comprises an interface requiring a pre-defined number of squeezes on the body of the ICA to activate, and wherein the pre-defined number of squeezes comprises a number greater than one.

2. The identification card apparatus of claim 1, wherein the visual unique identifier comprises a photograph of the user.

3. The identification card apparatus of claim 1, wherein the visual unique identifier comprises a unique number.

4. The identification card apparatus of claim 1, wherein the visual unique identifier comprises a transparent window through which an identification portion of a card is shown.

5. The identification card apparatus of claim 1, wherein the ICA comprises an identification card having a length at most 2.375 inches and a width at most 3.625 inches.

6. The identification card apparatus of claim 5, wherein the communication circuitry is disposed as part of the identification card.

7. The identification card apparatus of claim 5, wherein the position identification circuitry is disposed as part of the identification card.

8. The identification card apparatus of claim 5, wherein the panic control circuitry is disposed as part of the identification card.

9. The identification card apparatus of claim 1, further comprising a first housing sized and disposed to receive an identification card.

10. The identification card apparatus of claim 9, further comprising a second housing sized and disposed to receive a cellphone.

11. The identification card apparatus of claim 1, wherein the panic control interface further comprises a physical actuator.

12. The identification card apparatus of claim 1, wherein the panic control interface further comprises a sound actuator.

13. The identification card apparatus of claim 1, configured as a wallet, arm band, belt clip, or money clip.

14. The identification card apparatus of claim 1, further comprising a hole sized for use with a key ring or lanyard.

15. The identification card apparatus of claim 1, wherein the position identification circuitry, the communication circuitry, and the panic control interface are physically distributed between or among at least first and second cards.

\* \* \* \* \*